United States Patent [19]

Turner

[11] Patent Number: 4,505,944

[45] Date of Patent: Mar. 19, 1985

[54] FUGITIVE INK COMPOSITION

[75] Inventor: John D. Turner, Raleigh, N.C.

[73] Assignee: Cotton Incorporated, New York, N.Y.

[21] Appl. No.: 518,970

[22] Filed: Aug. 1, 1983

[51] Int. Cl.$^3$ .............................................. B05D 7/24
[52] U.S. Cl. ......................................... 427/8; 106/19; 106/22; 427/288; 427/341; 427/389.9
[58] Field of Search ............... 427/8, 341, 389.9, 288; 106/19, 22

[56] References Cited

U.S. PATENT DOCUMENTS

| | | | |
|---|---|---|---|
| 3,449,319 | 6/1969 | Kuhn | 106/19 |
| 3,850,649 | 11/1974 | Buerkley | 106/22 |
| 3,929,697 | 12/1975 | Morrill et al. | 427/392 |
| 4,202,566 | 5/1980 | Kosche | 427/150 |
| 4,228,222 | 10/1980 | Murakami et al. | 427/150 |
| 4,324,420 | 4/1982 | Kosche | 427/150 |

*Primary Examiner*—Norman Morgenstern
*Assistant Examiner*—Janyce A. Bell

[57] ABSTRACT

The present invention provides a fugitive ink composition, and a process for providing a fugitive mark on fibrous material. The fugitive ink comprises a dark organic pigment comprising a complex between a polyvalent metal and tannic acid, and a binding agent that is insoluble in water at a pH of about 7 and at a temperature in the range of from 0° to 100° C., and has a $T_{300}$ temperature in the range of from about 5° to about 150° C. The fugitive ink composition may further comprise a diluting agent, a dispersing agent, a wetting agent, a defoaming agent, a preservative, a basic reagent, and a viscosity controller. The fugitive ink composition of the present invention provides a dark identification mark that has the ability to withstand the vagaries of weather, yet substantially decolorizes upon being subjected to mechanical processing alone, or in conjunction with scouring and bleaching with a bleaching agent.

16 Claims, No Drawings

FUGITIVE INK COMPOSITION

BACKGROUND OF THE INVENTION

1. Field of the Invention

This invention relates to a fugitive ink composition for marking fibrous material, and a process of providing a fugitive mark on fibrous material.

2. Description of the Prior Art

Cotton is usually picked by a mechanical harvester which is driven along the row of cotton plants. The harvested cotton is collected in a large bin on the harvester. When the bin is filled, the seed cotton may be compressed into a module formed on a pallet, according to the method disclosed in U.S. Pat. No. 3,749,003, the content of which is hereby incorporated by reference. The module-supporting pallets are transported to the gin mill after harvesting where they are stored in an open gin yard.

Since the cotton harvested by numerous farmers may be temporarily stored at a single gin yard, farmers have sought a method of marking their modules for identification purposes. Gin operators also wish to identify modules for a number of reasons, including the date of delivery and quality. The conventional method of marking modules is the application of paint, especially crosslinked acrylic polymer spray paints. However, the paint mark survives the mechanical processing of the gin and mars the appearance of the cotton. Further, the paint mark is not fully eradicated upon the bleaching and scouring processes necessary to produce pure white cotton fabric. Thus, textile mills often declined to accept cotton tainted with paint contamination.

Various attempts have been made to mark cotton modules with compositions, described as being "fugitive". Fugitive is used here to describe a colored composition that is substantially removed by the subsequent processing of the substrate to which it is applied so that the appearance of the final product is not marred. However, the problem with known fugitive compositions is that some, such as cationic dyes, are bleached out in sunlight while others are not fully decolorized by the subsequent processing of the marked cotton.

As can be understood, the art is replete with compositions used as marking materials. However, each possesses disadvantages which detract from its ability to be used as a fugitive ink composition. For example, U.S. Pat. No. 499,161 describes a process for printing on cotton utilizing colors fixed by a metallic tannate. However, the use of a metallic tannate as a mordant dye permanently fixes the dyestuff upon the cotton.

U.S. Pat. No. 1,050,236 discloses a printing ink that includes a metallic salt and tannic acid. Again, as this ink is suitable for typewriter ribbons, it cannot be considered a fugitive composition.

U.S. Pat. Nos. 4,167,510 and 4,170,669 exemplify conventional fugitive tints used in identifying textiles during processing. These tints are pastel, are removed by water, and are thus not suitable for providing dark identification marks on fibrous material that is exposed to rain.

OBJECTS AND SUMMARY OF THE INVENTION

In view of the difficulties heretofore involved in providing a dark fugitive mark on fibrous material by conventional means, it is an object of this invention to provide a fugitive ink composition for marking fibrous materials, such as cotton, with a highly visible, dark identification mark.

It is also an object of the present invention to provide a fugitive ink composition that provides a dark identification mark that resists a variety of weather conditions, e.g., bright sunlight and rain, yet decolorizes sufficiently by conventional gin mill mechanical processes, bleaching agents, or both, so that the final product is not marred.

It is a further object of this invention to provide a process for providing a fugitive ink composition that may be readily applied to fibrous materials, and yields a highly visible, dark identification mark.

The present invention provides a fugitive ink composition and a process of providing a fugitive mark on fibrous material. The ink composition comprises a dark organic pigment that comprises a complex between a polyvalent metal and tannic acid, and a binding agent which is insoluble in water at a pH of about 7 and at a temperature in the range of from 0° to 100° C., and has a $T_{300}$ temperature in the range of from about 5° to about 150° C., wherein the ink composition substantially decolorizes upon the subsequent processing of the fibrous material.

DETAILED DESCRIPTION OF THE INVENTION

The composition and process provided by the present invention relate to the fugitive marking of fibrous material. Raw fibrous material, such as cotton, is processed before shipment to textile mills. Cotton, upon harvesting, may be compressed into modules. These modules are broken up according to the methods disclosed in the following U.S. Pat. Nos., which are hereby incorporated by reference: 4,190,932, 4,190,933, 4,192,042 and 4,194,269.

After the modules are broken up, the usable cotton is mechanically processed so as to separate the cotton from the trash and seeds. See U.S. Pat. Nos. 4,126,914 and 4,219,908, the contents of which are hereby incorporated by reference. Should the cleaned cotton be destined for lighter shades of material, or pure white material, it is then chemically treated by bleaching with a bleaching agent exemplified by hydrogen peroxide, and sodium hypochlorite.

The composition of the present invention will fugitively mark any fibrous material whose surface is wettable by a water-solution that contains a wetting agent. Such fibrous materials includes cotton, wool, rags, paper, and synthetic material such as polypropylene. The composition essentially consists of a dark organic pigment and a binding agent. When dried, the composition resists fading under the action of rain or bright sunlight, yet upon further processing either by mechanical processing alone or in conjunction with scouring and bleaching with a bleaching agent, the ink composition substantially decolorizes. That is, it decolorizes to the extent that the final product, e.g., a woven textile fabric, is not marred by residue of the ink composition.

The pigment of the ink composition is a complex between a polyvalent metal and tannic acid. The polyvalent metals that may be employed include the chromic form of chromium, aluminum, zinc, the cupric form of copper, the stannic form of tin, and is preferably the ferric form of iron. The source of the polyvalent metal may be a salt having an anion such as sulfate, halogen, nitrate, and is preferably chloride. Mixtures of either the polyvalent metals and/or the anions may also be employed. An especially preferred pigment is the ferric tannate complex that results from the reaction between ferric chloride and tannic acid. Compositions wherein ferrous tannate was the complex were found to provide a fugitive mark, but prematurely oxidized and required an acidic delivery environment. These characteristics preclude the use of an aerosol delivery system.

The fugitive ink composition of the present invention comprises the pigment in an amount ranging from about 0.2 to about 10% by weight of the total composition. A preferred range is from about 1 to about 4% by weight of the total composition, with the most preferred range being from about 2 to about 3% by weight of the total composition.

The fugitive ink composition of the present invention further includes a binding agent that is insoluble in water at a pH of about 7 and at a temperature in the range of from about 0° to about 100° C. Further, for the ink to be fugitive, the binding agent must not only hold the pigment in place, but must also cause the ink to be brittle so that the mark is almost completely removed upon the mechanical processing of the fibrous material. Thus, the binding agent must have a $T_{300}$ temperature in the range of from about 5° to about 500° C., preferably from about 10° to about 30° C. $T_{300}$ is defined here as the temperature at which the torsional modulus of an air-dried film is approximately 300 kg/cm$^2$. The determination of $T_{300}$ is described in Mechanical Properties of Polymers, L. E. Nielson, Reinhold Publishing Corp., New York, N.Y., 1962.

Suitable polymer binding agents which meet the foregoing criteria include non-crosslinking acrylic polymers, such as those made by the polymerization of acrylic acid, methacrylic acid, ethyl acrylate, methyl acrylate and butyl acrylate. "Non-crosslinking" is used here to describe acrylic polymers that will not undergo intra- or intermolecular crosslinking in environments used to treat the fugitively marked fibrous material, e.g., heating, scouring, and bleaching, to such an extent as to interfere with the decolorization of the fugitive mark. The preferred binding agent is the anionic acrylic polymer emulsion Rhoplex AC61, marketed by Rohm and Haas. Other possible binding agents include nonionic acrylic polymer emulsions, such as Rhoplex HA-12, also marketed by Rohm and Haas, polyvinyl acetate, polyvinyl alcohol, starch, and carboxymethylcellulose. The binding agent is present in an amount ranging from about 0.5 to about 10% by weight of the total composition. A preferred range is from about 1 to about 10% by weight of the total composition, with the most preferred range being from about 2 to about 4% by weight of the total composition.

In the fugitive ink composition of the present invention, the ratio of the weight of the pigment to the weight of the binding agent may range from about 1:0.2 to about 1:10, preferably from about 1:0.5 to about 1:3.

The fugitive ink composition of the present invention may further include a diluting agent, a dispersing agent, a wetting agent, and mixtures thereof. As used herein, a "dispersing agent" is one that will enable particles of the organic pigment to be in a dispersed phase within the composition of the present invention, and a "wetting agent" is one that will cause the ink to wet the substrate to be fugitively marked.

The diluting agent may be present in an amount of from about 60 to about 99% by weight; the dispersing agent may be present in an amount of from about 0.01 to about 5% by weight; and the wetting agent may be present in an amount of from about 0.01 to about 5% by weight, with all weight percentages being based on the weight of the total composition.

The diluting agent may be selected from the group consisting of water, alcohol, glycol and mixtures thereof. The dispersing agent may be selected from the group consisting of water-based, anionic salts of polymerized alkyl aryl sulfonic acids, water-based anionic salts of carboxylate polyelectrolytes, such as Tamol 850 and Tamol 960 available from Rohm & Haas Co., acrylic copolymers with acid functions, such as Acrysol I-94, available from Rohm and Haas, or other suitable anionic material. The wetting agent may be selected from the group consisting of the anionic sodium dodecyldiphenyloxide disulphonate surfactant, available from Dow Chemical Co. as Dowfax 2A1, the aforementioned water-based anionic salts of carboxylate polyelectrolytes, and a nonionic surfactant such as trimethyl nonyl polyethylene glycol ether, available from Union Carbide Corp. as Tergitol TMN-6. In some instances, the functions of the dispersing agent and wetting can be satisfied by a single compound such as Dowfax 2A1.

In a preferred embodiment, the fugitive ink composition of the present invention comprises water, in an amount of from about 80 to about 90% by weight; Tamol 960 in an amount of from about 0.2 to about 5% by weight; Dowfax 2A1 in an amount of from about 0.1 to about 3% by weight, and Tergitol TMN-6 in an amount of from about 0.1 to about 3% by weight, with all weight percentages being based on the total weight of the composition.

In a preferred embodiment, the fugitive ink composition of the present invention is applied as an aerosol. Therefore, to the ink described above are added a defoaming agent, such as Defoamer DF160 available from Diamond Shamrock Company, a conventional preservative to prevent microbial attack of the tannate complex, exemplified by Dowicide A available from Dow Chemical Company, a viscosity controller to thicken the composition, such as Acrysol ASE60 available from Rohm & Haas Company, and a basic reagent. The basic reagent, such as sodium hydroxide and preferably aqueous ammonia, is added to prevent corrosion in the metal aerosol spray cans and to make the dispersing agent effective in an aerosol. Thus, any basic reagent which serves this function and which does not otherwise substantially adversely affect the desired characteristics of the composition is acceptable.

The defoaming agent may be present in an amount ranging from about 0.1 to about 3% by weight; the preservative may be present in an amount ranging from about 0.1 to about 4% by weight; the viscosity controller may be present in an amount ranging from about 0.2 to about 5% by weight; and the basic reagent may be present in an amount ranging from about 0.1 to about 10% by weight, with all weight percentages being based on the total weight of the composition. In the container, the aerosol composition will, of course, also include a conventional propellant, such as carbon dioxide, propane, or ethane, in amounts known to those in the art.

The conditions under which the organic pigment of the fugitive ink of the present invention is formed are important to the efficiency of the composition and its ability to be applied to fibrous material. The reaction between the source of the polyvalent metal, such as $FeCl_3$, and tannic acid should occur in an acidic environment. In a basic environment, a reaction will occur between the basic reagent and the source of the polyvalent metal so as to interfere with the formation of the organic pigment. Therefore, the solution should be made basic by the addition of the basic reagent only after this reaction is complete.

The following Examples are given as a specific illustrations of the invention. It should be understood, however, that the invention is not limited to the specific details set forth in the Examples.

COMPARATIVE EXAMPLE

The following materials are mixed in their listed order, by vigorous agitation. Water—96.4%, Dowfax 2Al—0.2%, Tannic Acid—2.0% Sodium Hydrosulfate—0.2%, Ferrous Sulfate—1.0%, and formaldehyde 0.2%, with all weight percentages based upon the weight of the total composition. This composition is applied as a solution to a cotton module, resulting in a fugitive mark. However, this composition suffers from the premature oxidation of ferrous tannate to a ferric tannate precipitate, and the requirement of an acidic delivery environment. Both of the characteristics tend to preclude the use of an aerosol delivery system.

EXAMPLE 1

A fugitive ink composition of the present invention, capable of aerosol delivery, is provided by mixing by vigorous agitation and at room temperature the following ingredients in the order in which they are listed:

| Ingredient | Percent by Weight of the Total Composition |
|---|---|
| Water | 50.0 |
| Dowflax 2Al | 0.1 |
| Tamol 960 | 1.0 |
| Ferric Chloride | 0.6 |
| Water | 38.8 |
| Tannic Acid | 2.0 |
| Defoamer DF160 | 0.2 |
| Water | 0.4 |
| Aqueous $NH_3$ | 2.0 |
| Dowicide A | 0.1 |
| Rhoplex AC61 | 4.0 |
| Acrysol ASE60 | 0.8 |
| | 100.0 |

Unlike the composition of the Comparative Example, the composition is stable and can be safely applied by an aerosol delivery system. When this ink composition is sprayed upon a cotton module a dark, brittle mark results. Upon exposure to rain and bright sunlight for three months, the mark remains highly visible. When the cotton module is broken up and otherwise mechanically processed and cleaned, the mark is almost totally removed. Upon bleaching the cotton with hydrogen peroxide the mark is completely decolorized.

EXAMPLE 2

A fugitive ink composition of the present invention, capable of aerosol delivery, is provided by mixing by vigorous agitation and at room temperature, the following ingredients in the order in which they are listed:

| Ingredient | Percent by Weight of the Total Composition |
|---|---|
| Water | 83.7 |
| Dowfax 2Al | 0.1 |
| Defoamer DF160 | 1.3 |
| Tamol 960 | 1.0 |
| Ferric Chloride | 0.6 |
| Tannic Acid | 2.0 |
| Aqueous $NH_3$ | 2.0 |
| Dowicide A | 0.2 |
| Rhoplex AC61 | 4.0 |
| Acrysol ASE 60/Water Premix | 4.8 (1.2/3.6) |
| Tergitol TMN-6 | 0.1 |
| | 100.0 |

This ink composition is sprayed upon a cotton module, resulting in a dark, brittle mark. Upon exposure to rain and bright sunlight for three months, the mark remains highly visible. When the module is broken up and otherwise mechanically processed and cleaned, the mark is almost totally removed. Upon bleaching the cotton with hydrogen peroxide, the mark is completely decolorized.

Although the invention has been described with preferred embodiments, it is to be understood that variations and modifications may be employed as will be apparent to those skilled in the art. Such variations and modifications are to be considered within the scope of the claims appended hereto.

I claim:

1. A fugitive ink composition for marking fibrous material, comprising:
(a) a dark organic pigment that comprises a complex between a polyvalent metal and tannic acid; and
(b) a binding agent which is insoluble in water at a pH of about 7 and at a temperature in the range of from 0° to 100° C., and has a $T_{300}$ temperature in the range of from about 5° to about 150° C.,
wherein the ratio of the weight of said pigment to the weight of said binding agent ranges from about 1.0:0.2 to about 1:10, and wherein said ink composition substantially decolorizes upon subsequent processing comprising mechanical agitation of said marked fibrous material.

2. The fugitive ink composition of claim 1, wherein said polyvalent metal is selected from the group consisting of the chromic form of chromium, aluminum, zinc, the cupric form of copper, the ferric form of iron, the stannic form of tin and mixtures thereof.

3. The fugitive ink composition of claim 1, wherein said complex is ferric tannate.

4. The fugitive ink composition of claim 1, wherein said binding agent is selected from the group consisting of non-crosslinking acrylic polymers, polyvinyl acetate, polyvinyl alcohol, starch, carboxymethyl cellulose and mixtures thereof.

5. The fugitive ink composition of claim 1, wherein said binding agent is a non-crosslinking acrylic polymer.

6. The fugitive ink composition of claim 1, further comprising
(c) a diluting agent;
(d) a dispersing agent, and
(c) a wetting agent,
wherein said diluting agent is present in an amount ranging from about 60 to about 99% by weight, said dispersing agent is present in an amount ranging from about 0.01 to about 5% by weight and said wetting agent is present in an amount ranging from about 0.01 to about 5% by weight, with all weight percentages based upon the total weight of the composition.

7. The fugitive ink composition of claim 6, wherein said organic pigment comprises from about 0.2 to about 10% by total weight of the composition, and said binding agent comprises from about 1 to about 10% by total weight of the composition.

8. The fugitive ink composition of claim 6, wherein said diluting agent is selected from the group consisting of water, alcohol, glycol, and mixtures thereof.

9. The fugitive ink composition of claim 6, wherein said dispersing agent is selected from the group consisting of salts of polymerized alkyl aryl sulfonic acids, acrylic copolymers with acid functions, salts of carboxylate polyelectrolytes, and mixtures thereof.

10. The fugitive ink composition of claim 6, wherein said wetting agent is selected from the group consisting of salts of carboxylate polyelectrolytes and trimethyl nonyl polyethylene glycol ether.

11. The fugitive ink composition of claim 6, further comprising
    (f) a defoaming agent,
    (g) a preservative,
    (h) a basic reagent, and
    (i) a viscosity controller,
wherein said defoaming agent is present in an amount ranging from about 0.1 to about 3% by weight; said preservative is present in an amount ranging from about 0.1 to about 4% by weight; said basic reagent is present in an amount ranging from about 0.1 to about 10% by weight; and said viscosity controller is present in an amount ranging from about 0.2 to about 5% by weight, with all weight percentages based upon the total weight of the composition.

12. The fugitive ink composition of claim 11, comprising:
    ferric chloride,
    tannic acid,
    water,
    aqueous ammonia,
    an anionic surfactant,
    an anionic dispersant,
    a nonionic surfactant
    a defoaming agent,
    a biocide,
    an anionic acrylic emulsion,
    and a noncrosslinking acrylic polymer.

13. A process of providing and removing a fugitive mark on fibrous material comprising the steps of:
    (a) contacting said fibrous material with a fugitive ink composition comprising:
        (i) a dark organic pigment that comprises a complex between a polyvalent metal and tannic acid; and
        (ii) a binding agent, which is insoluble in water at a pH of about 7 and at a temperature in the range of from 0° to 100° C., and has a $T_{300}$ temperature in the range of from about 5° to about 150° C., wherein the ratio of the weight of said pigment to the weight of said binding agent ranges from about 1.0:0.2 to about 1:10,
    so as to provide an identification mark on said fibrous material, wherein said identification mark decolorizes when said fibrous material is subjected to subsequent processing;
    (b) drying said fugitive ink composition to provide marked fibrous material; and
    (c) processing the marked fibrous material to substantially decolorize the ink composition, said processing comprising mechanical agitation of the marked fibrous material.

14. The process of providing and removing a fugitive mark on fibrous material of claim 13, wherein said fibrous material comprises a cotton bale.

15. The process of providing and removing a fugitive mark on fibrous material of claim 13, wherein said subsequent processing comprises scouring and bleaching with a bleaching agent.

16. The process of providing and removing a fugitive mark on fibrous material of claim 13, wherein said subsequent agitation comprises both mechanical processing, and scouring and bleaching with a bleaching agent.

* * * * *

UNITED STATES PATENT AND TRADEMARK OFFICE
CERTIFICATE OF CORRECTION

PATENT NO.   :   4,505,944
DATED        :   March 19, 1985
INVENTOR(S)  :   John D. Turner It is certified that error appears in the above-identified patent and that said Letters Patent is hereby corrected as shown below:

Claim 16, line 3, amend "agitation" to --processing--;

and amend "processing" to agitation".

*Signed and Sealed this*

*Twenty-fourth* Day of *September 1985*

[SEAL]

*Attest:*

*Attesting Officer*

DONALD J. QUIGG

*Commissioner of Patents and Trademarks—Designate*